(12) United States Patent
Van Den Berg

(10) Patent No.: US 8,950,358 B2
(45) Date of Patent: Feb. 10, 2015

(54) DEVICE FOR AND A METHOD OF MILKING A DAIRY ANIMAL

(75) Inventor: Karel Van Den Berg, Bleskensgraaf (NL)

(73) Assignee: Lely Patent N.V., Maassluis (NL)

( * ) Notice: Subject to any disclaimer, the term of this patent is extended or adjusted under 35 U.S.C. 154(b) by 0 days.

(21) Appl. No.: 13/339,396

(22) Filed: Dec. 29, 2011

(65) Prior Publication Data

US 2012/0097108 A1 Apr. 26, 2012

Related U.S. Application Data

(63) Continuation of application No. PCT/NL2010/000095, filed on Jun. 14, 2011.

(30) Foreign Application Priority Data

Jul. 3, 2009 (NL) ..................................... 1037095

(51) Int. Cl.
*A01J 5/04* (2006.01)
*A01J 5/007* (2006.01)
*A01J 5/08* (2006.01)
*A01J 7/00* (2006.01)

(52) U.S. Cl.
CPC .. *A01J 5/007* (2013.01); *A01J 5/08* (2013.01); *A01J 7/005* (2013.01)
USPC ..................... 119/14.2; 119/14.47; 119/14.52

(58) Field of Classification Search
USPC .................................. 119/14.2, 14.47, 14.52
See application file for complete search history.

(56) References Cited

U.S. PATENT DOCUMENTS 4,200,058 A * 4/1980 Happel ..................... 119/14.01
5,666,904 A 9/1997 Grindal (Continued)

FOREIGN PATENT DOCUMENTS

| DE | 41038 A1 | 10/1965 |
|---|---|---|
| EP | 1523878 A1 | 4/2005 |
| WO | 9948357 A1 | 9/1999 |
| WO | 13489 A2 | 3/2000 |
| WO | 2008030084 A2 | 3/2008 |

OTHER PUBLICATIONS

Search Report and Written Opinion of PCT/NL2010/000095 issued Sep. 16, 2010.

(Continued)

*Primary Examiner* — Kristen C Hayes
(74) *Attorney, Agent, or Firm* — Hoyng Monegier LLP; Minerva Rivero; David P. Owen

(57) ABSTRACT

A milking device for milking a dairy animal, including at least one teat cup including a flexible cup liner around a teat space, and a single pulsation space and a milk line, a milking vacuum pump connected to the milk line, for providing a milking vacuum, a pulsator connected to the pulsation space, for providing a controllable air pressure therein, and a control device for controlling at least the pulsator during at least a milking action. The control device is configured to cause the pulsator and/or the milking vacuum pump to provide, in a period of time consecutive to a milking action wherein a dairy animal is milked and a teat is located in the teat space, such a substantially stable, non-pulsating pressure difference between the pulsation space and the teat space, that the cup liner shuts off the teat space from the milk line.

13 Claims, 3 Drawing Sheets

(56) References Cited

U.S. PATENT DOCUMENTS

| | | | |
|---|---|---|---|
| 6,546,893 B1 * | 4/2003 | Happel et al. | 119/14.47 |
| 8,397,671 B2 * | 3/2013 | Hanskamp | 119/14.38 |
| 2002/0033140 A1 * | 3/2002 | Van der Lely et al. | 119/14.11 |
| 2005/0076841 A1 | 4/2005 | Van Den Berg et al. | |

OTHER PUBLICATIONS

Database WPI week 198014, Thomson Scientific, London, GB, AN 1980-D0959C, XP002570046 & SU676243.

* cited by examiner

DEVICE FOR AND A METHOD OF MILKING A DAIRY ANIMAL

CROSS REFERENCE TO RELATED APPLICATIONS

This application is a continuation of PCT application number PCT/NL2010/000095 filed on Jun. 14, 2010, which claims priority from Netherlands application number NL1037095 filed on Jul. 3 2009. Both applications are hereby incorporated by reference in their entireties.

BACKGROUND OF THE INVENTION

1. Field of the Invention

The invention relates generally to a milking device for milking a dairy animal, comprising at least one teat cup, wherein the teat cup comprises a cup casing with a flexible cup liner around a teat space, and a single pulsation space and a milk line, a milking vacuum pump connected to the milk line, for providing a milking vacuum, a pulsator connected to the pulsation space, for providing a controllable air pressure in the pulsation space, and a control device which is configured to control at least the pulsator during at least a milking action.

2. Description of the Related Art

Milking devices, in particular automatic milking devices, are generally known in the state of the art. The milking vacuum is used here to extract milk from the teat, while the pulsator ensures that the cup liner shuts off in a pulsating manner the teat space, which receives the teat, from the milking vacuum. In this case, pressure is advantageously exerted on the teat in order to press blood and other tissue fluid from the teat and to prevent damming.

With automatic milking devices, the milking vacuum is in principle maintained after the milking action has been ended, at any rate at least for some time after the milking action has been ended. There is thus a chance for dirt or other contaminants to be sucked into the milk line. In the state of the art, it is known to incorporate in the milk line, before the milk tank, at least before the milk jar, a valve which shuts off the milk line after the milking action has been ended. However, it is found that such a device does not always work in a reliable manner in practice. There is still a great chance of dirt being sucked in. Moreover, there is a fair chance of failures in the operation of the valve.

BRIEF SUMMARY OF THE INVENTION

It is an object of the present invention to obviate said drawbacks at any rate at least partially or to provide a usable alternative.

This object is achieved by a milking device comprising at least one teat cup, wherein the teat cup comprises a cup casing with a flexible cup liner around a teat space, and a single pulsation space and a milk line, a milking vacuum pump connected to the milk line, for providing a milking vacuum, a pulsator connected to the pulsation space, for providing a controllable air pressure in the pulsation space, and a control device which is configured to control at least the pulsator during at least a milking action. The milking device according to the invention is characterized in that the control device is configured to cause the pulsator and/or the milking vacuum pump to provide, in a period of time consecutive to a milking action wherein a dairy animal is milked and a teat is located in the teat space, such a substantially stable, non-pulsating pressure difference between the pulsation space and the teat space, that the cup liner shuts off the teat space from the milk line.

A great advantage of the invention is that the milk line can be shut off at an earliest possible point, i.e. as far upstream as possible in the milk line, namely already in the cup liner itself. The chance of penetration of dirt is thus further reduced with respect to a more downstream located shut-off valve. For, with the latter device, it is still possible for dirt to penetrate into the milk line, which dirt will then be sucked in further at a next milking action. Moreover, the device according to the present invention has a reduced number of components, because it does not comprise a separate valve, in contrast with the known device. This also results in a reduced chance of failures. As long as the pulsator and the cup liner will be able to pulsate for the milking action, these will normally also be able to shut off. For, this also takes place at the milking action itself, albeit in a pulsating manner and in each case only during a very short period of time.

One of ordinary skill in the art will appreciate that by the phrase "shutting off the milk line in a stable, non-pulsating manner" what is meant that the milk line is shut off during a period of time of at least twice the longest closing duration during pulsation. In particular, the milk line is shut off during at least 10 seconds, and, more in particular, the period of time extends for as long as the milking vacuum pump provides a milking vacuum in the milk line. The device is thus well protected against sucking in contamination.

In particular, the period of time also extends consecutive to a milking action, in particular in each case between two successive milking actions, such as substantially during the entire period of time between two milking actions. In this manner, the device is still better protected against contamination, because it also remains closed when the vacuum pump is switched off, at least when no milking vacuum is provided in the milk line. In practice, the milking vacuum pump can be switched off when, for example, during a longer period of time no milking has been planned or is anticipated. Although, in that case, there is no chance of dirt being sucked in, dirt can still penetrate into the non-closed part of the milk line. The present invention is extra advantageous because said non-closed part is very short.

The milking device according to the invention is advantageously configured to cause the pulsator to provide an overpressure in the pulsation space. By overpressure is meant here an overpressure with respect to atmospheric pressure. This makes it possible to guarantee, of course at an overpressure that is sufficient to cause the cup liner to fold and close off, that the cup liner shuts off the milk line and keeps it closed, even if no milking vacuum is provided. On the other hand, if and as long as a milking vacuum is provided, the pressure that the pulsator should cause to prevail in the pulsation space may also be higher. In a particular situation, the milking vacuum pump is configured to continue to provide a milking vacuum in the milk line and the pulsator is configured to provide a pressure higher than atmospheric pressure in the pulsation space, in such a manner that the pressure difference is sufficient for shutting off the milk line in a stable and non-pulsating manner. At a milking vacuum of around 50 kPa, which is usual in practice, the cup liner will then close and remain closed. It is pointed out here that, with the usual cup liners, providing only atmospheric pressure in the pulsation space has proved to be insufficient to keep the cup liner closed, even at a prevailing milking vacuum. In practice, when the pulsation space is only aerated, the cup liner will reopen after a short time by the own elasticity of the liner. This is caused by inwardly leaking air, usually a combination of unintentional leakage and leakage air currents through leakage openings which are provided for milk flow stimulation, in which case the milking vacuum is insufficient to compensate therefor. In the present invention, the cup liner is nevertheless found to remain closed in this situation if a sufficiently great overpressure has been provided in the pulsation space.

The overpressure amounts in particular to at least 0.2 bar and at most 2 bar, more in particular to between 0.35 and 0.65 bar. At such pressures, the cup liner is found to shut off well, while in particular pressures between 0.35 and 0.65 can still be provided in a simple manner by customary pumping means which are also used for milking and/or pulsating vacuum. The pressures used therein are of the same order of magnitude, in which case, if possible, only the pumping direction should be reversed.

In embodiments, the cup liner, in particular near the connection to the milk line, has a first wall portion with a folding resistance that is reduced with respect to other wall portions of the cup liner. In particular, the cup liner opposite to the first wall portion comprises a wall portion with a higher folding resistance, against which the first wall portion substantially shuts off the teat space at said pressure difference. Such cup liners are pre-eminently suitable because they have already been prepared to shut off in a controlled and improved manner. They are marketed, for example, the AktivPuls liner system by the company System Happel GmbH, located in Miihlweg 4/Salenwang D-87654 Friesenried, Germany. However, these known liners have in principle been developed for a better closing during a milking action, and the associated milking devices, equipped with such cup liners, are not designed according to the present invention.

In particular, the device comprises a milking robot which is configured to connect the at least one teat cup to a teat of a dairy animal. Because such a device operates in principle without human supervision, and it is thus impossible to take special attention to ensure that no dirt, or at least as little dirt as possible penetrates into the device, the advantage of the invention reveals itself clearly in this case.

Advantageously, the device comprises an autonomous self-propelled vehicle which is configured to displace the at least one teat cup, and which comprises in particular a milking robot which is configured to connect the at least one teat cup to a teat of a dairy animal. In particular, the milking device is displaceable as a whole by means of the autonomous self-propelled vehicle. Such autonomous vehicles should be able to connect the teat cups under a cow, and to move between cows without hindering them. Owing to this, their dimensions are in principle limited, and the vehicle is advantageously as compact as possible. The present invention provides this advantage by omitting an additional, and in this case superfluous, shut-off device in the milk line.

BRIEF DESCRIPTION OF THE DRAWINGS

The features and advantages of the invention will be appreciated upon reference to the following drawings, in which.

DESCRIPTION OF ILLUSTRATIVE EMBODIMENTS

Figure 1:
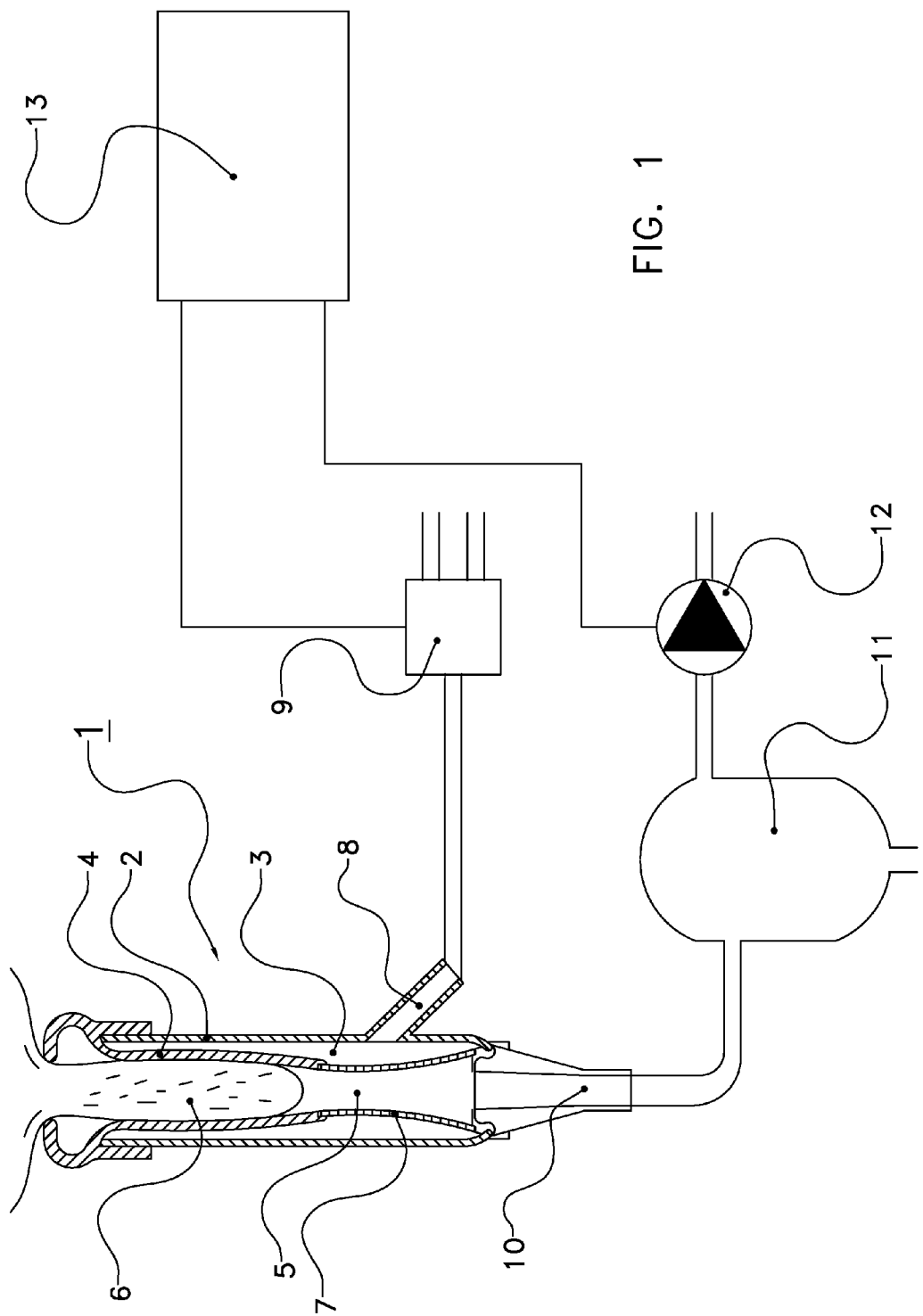
FIG. 1 is a diagrammatic and partially cut-away view of a milking device according to the invention.

The following is a description of certain embodiments of the invention, given by way of example only and with reference to the drawings. FIG. 1 is a diagrammatic and partially cut-away view of a device according to the invention. In this figure, reference numeral 1 denotes a teat cup comprising a cup casing 2. At the inside thereof, the pulsation space 3, the cup liner 4 which shuts off the latter, and the teat space 5 are located. In the figure, a teat 6 is received in the teat space. A weakened portion of the cup liner is denoted by 7.

There are also shown a pulsator connection 8 to a pulsator 9, and a milking vacuum line or milk line 10 to a milk jar 11 and a milking vacuum pump 12. A control device is denoted by 13.

The cup liner 4 comprises a wall which is flexible and which is, for example, made of an elastomer. The cup liner is deformable by applying a pressure difference on either side of at least a part of the cup liner wall, in particular between the pulsation space 3 and the teat space 5. A deformation of the cup liner 4 is required during a milking action, in which case a teat 6 is located in the teat space 5. Owing to the deformation, the cup liner 4 closely fits the teat and a pressure can be exerted on the teat 6 in order to generate damming back of tissue fluid.

The pressure difference can be generated via the milk line 10 which is connectable to the cup liner 4. In one embodiment, the milk line can be integral with the cup liner, so that the cup liner and the milk line form an integral whole. With the aid of a vacuum pump 12, a milking vacuum can be generated in the milk line 10. During the milking action the milking vacuum pump 12 is controlled by a control device 13, in such a manner that a milking vacuum is generated in the milk line. This may result in a flow of milk in the milk line.

During milking, the pulsator 8 will alternately apply a (pulsation) vacuum and a substantially atmospheric pressure to the pulsation space. In the first case, the cup liner 4 will open for the milking, provided that the pulsation vacuum is sufficiently high while, in the other case, the atmospheric air pressure in the pulsation space 3 will close the cup liner 4, in order thus to exert some pressure on the teat (tip) to counteract damming in the teat. In order to facilitate the closing, the cup liner 4 comprises a weakened portion 7.

The milking device is characterized in that the control device 13 is further configured to control the pulsator 8 and/or the milking vacuum pump 12 in a period of time which is consecutive to the milking action. The period of time relates, for example, to connecting or disconnecting the teat cup 1 to or from a teat 6, but also to the time between two milkings.

During the period of time, the milking vacuum pump 12 provides in principle a milking vacuum in the milk line 10. In the state of the art, an additional valve is incorporated further downstream in the milk line 10, in order to prevent the milk line 10 from sucking in air and dirt. According to the present application, it suffices to keep the cup liner 4 closed by allowing a sufficient pressure difference between the milk line 10 and the pulsation space 3 to persist. In practice, many teat cups 1 are found to have such a leakage air flow that, at an atmospheric pulsation space 3 and a milking vacuum in the milk line 10, the cup liner 4 will still open. In order to prevent this, there is preferably provided an overpressure of, for example, 35-65 kPa in the pulsation space 3, which overpressure is substantially permanently present during the duration. This enhances the reliability of the closing of the cup liner 4. It will be simple to configure the control device to control the milking vacuum pump 12 and the pulsator 8 in that way.

Of course, the device shown here may also comprise more than one teat cup, such as four teat cups for cows, etcetera. The device may form part of a conventional milking device, wherein the teat cups 1 are manually connected to the teats. Upon completion of a milking action, such as disconnection or falling off of the teat cups, the pulsator 8 and the milking vacuum pump 12 will continue to supply the required overpressure, underpressure, respectively, until a next milking action takes place or, for example, until the teat cups are protected in another manner against sucking in dirt. However, the invention is particularly advantageous with automatic milking devices, wherein the teat cups 1 are connected to the teats 6 with the aid of a robot arm and a teat recognition. Automatic milking devices are known to one of ordinary skill in the art, and have been previously described, such as in for example US2005076841 and WO2008030084, both references are hereby incorporated by reference in their entireties. As, in this case, there is no supervision by an operator, a reliable protection against sucking in air and dirt is extra important. The entire milking device may form a stationary part of a stable, etcetera, but may also be incorporated on a non-shown displaceable vehicle, in particular on an autonomously displaceable trolley. Such an autonomous milking vehicle can independently move to a dairy animal, connect the teat cups 1 on the spot and milk the dairy animal. Since such a vehicle is preferably as compact as possible and comprises a minimum of (moving) parts, the invention is of great advantage here.

Figure 2:
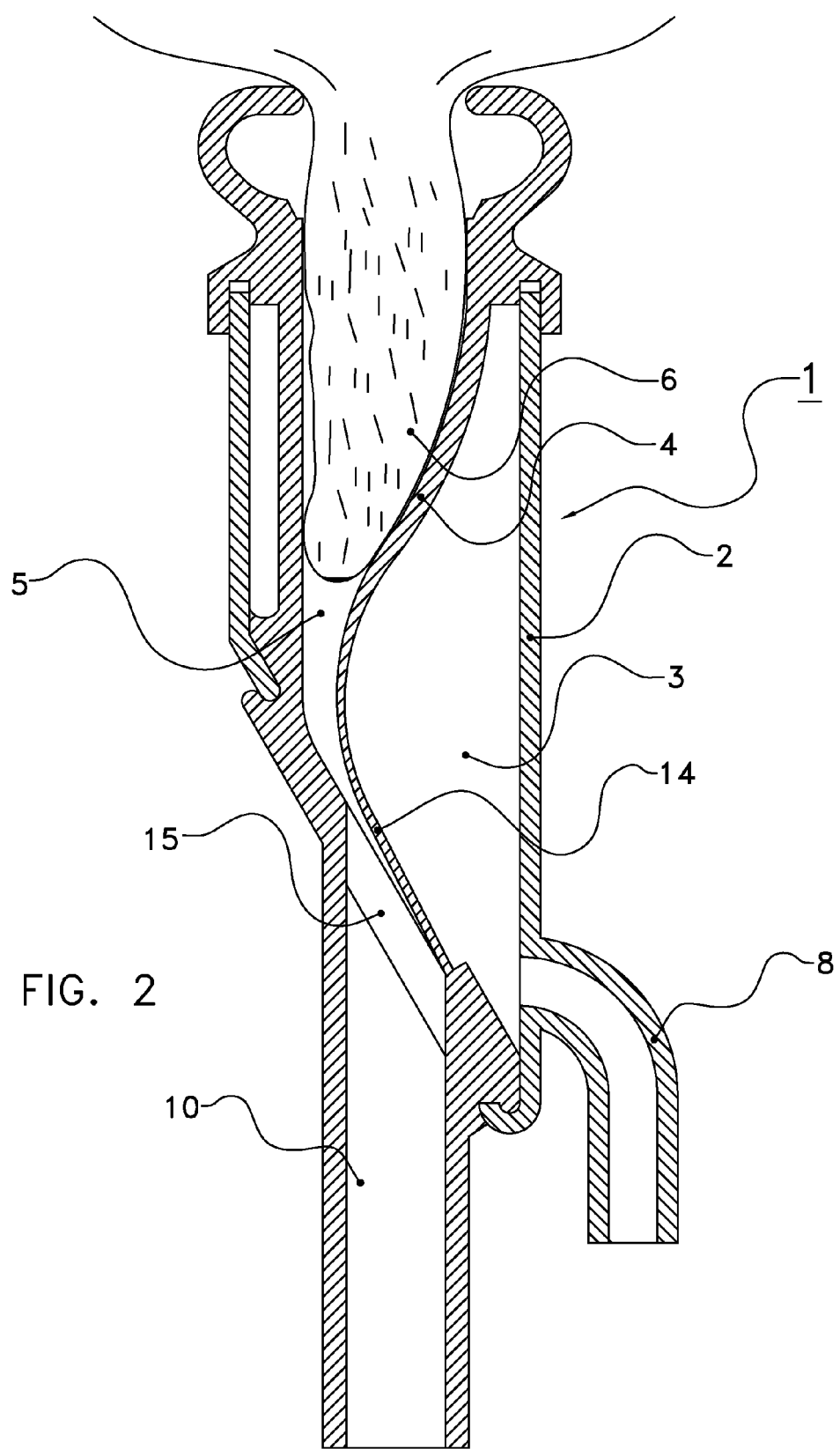
FIG. 2 is a diagrammatic cross-sectional view of a teat cup which is suitable for the invention.

FIG. 2 is a diagrammatic cross-sectional view of a teat cup which is suitable for the invention. Said cup liner is set out in further detail in WO 00/13489, which is hereby incorporated by reference in its entirety. Identical components are denoted by the same reference numerals. Additionally, in the teat cup shown, 14 designates a closing part of the cup liner 4, while 15 designates a to-be-closed opening to the milk line 10.

Figure 3:
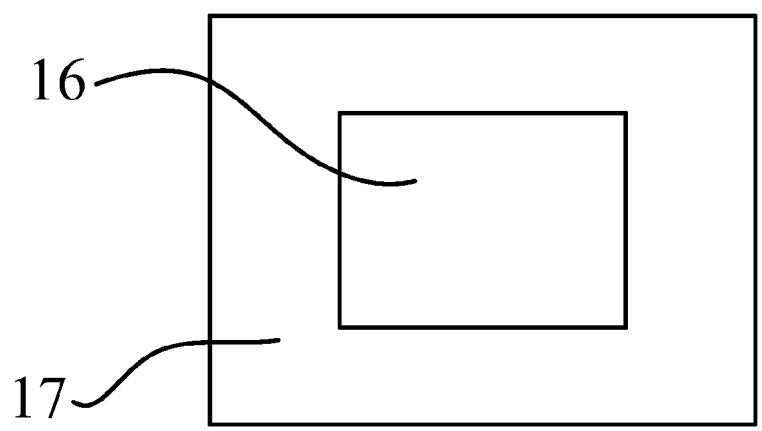
FIG. 3 shows diagrammatic view of a milking robot and a self-propelled vehicle according to the invention.

FIG. 3 is a diagrammatic view of an autonomous self-propelled vehicle 17 which is configured to displace the at least one teat cup, and which comprises in particular a milking robot 16 which is configured to connect the at least one teat cup to a teat of a dairy animal.

A great advantage of the teat cup shown is that the cup liner 4 thereof, and in particular the closing part 14, is able to shut off the teat space 5 from the milking vacuum in the milk line 10. For, instead of opposite parts of the cup liner 4 folding inwardly and against each other, like in the state of the art, a closing part 14 of the cup liner 4 now folds against and over an opening 15. Said opening 15 is obliquely disposed in the cup casing 2, so that a very reliable closing is obtained. In this embodiment, no overpressure need be provided in the pulsation space 3, although actually providing same ensures an even more reliable closing. It should be noted that, also here, the closing part 14 may be weakened, in order to achieve a greater flexibility.

According to the invention, there is thus provided a milking device comprising a control device which is configured to generate a stable pressure difference between the teat space and a pulsation space, which enables an improved leak-tight closing of the milk line. Moreover, the closure is positioned so close to the opening of the teat cup that contaminants cannot penetrate far into the milking device.

Further modifications in addition to those described above may be made to the structures and techniques described herein without departing from the spirit and scope of the invention. Accordingly, although specific embodiments have been described, these are examples only and are not limiting upon the scope of the invention.

What is claimed is:
1. A milking device, comprising
at least one teat cup, wherein the teat cup comprises a cup casing with a flexible cup liner around a teat space, and a single pulsation space and a milk line,
a milking vacuum pump connected to the milk line, for providing a milking vacuum,
a pulsator connected to the pulsation space, for providing a controllable air pressure in the pulsation space, and
a control device which is configured to control at least the pulsator during at least a milking action,
wherein the control device is configured to cause the at least one of the pulsator and the milking vacuum pump to provide, in a period of time during a connection of the at least one teat cup to a teat, or in a period of time during a disconnection of the at least one teat cup from a teat, and when a teat is no longer in the teat space, consecutive a milking action wherein a dairy animal is milked, a substantially stable, non-pulsating pressure difference between the pulsation space and the teat space such that the cup liner shuts off the teat space from the milk line.

2. The milking device according to claim 1, wherein, during the period of time, the pressure difference extends for as long as the milking vacuum pump provides a milking vacuum in the milk line.

3. The milking device according to claim 1, wherein the duration of the non-pulsating pressure difference extends consecutive to a milking action.

4. The milking device according to claim 3, wherein the duration is the entire period of time between two successive milking actions.

5. The milking device according to claim 1, configured to cause the pulsator to provide an overpressure in the pulsation space.

6. The milking device according to claim 5, wherein the overpressure amounts to at least 0.2 bar and at most 2 bar.

7. The milking device according to claim 6, wherein the overpressure amounts to between 0.35 and 0.65 bar.

8. The milking device according to claim 1, wherein the cup liner near the connection to the milk line, has a first wall portion with a folding resistance that is reduced with respect to other wall portions of the cup liner.

9. The milking device according to claim 8, wherein the cup liner opposite to the first wall portion comprises a wall portion with a higher folding resistance and against which the first wall portion substantially shuts off the teat space at said pressure difference.

10. The milking device according to claim 1, comprising a milking robot which is configured to connect the at least one teat cup to a teat of a dairy animal.

11. The milking device according to claim 1, comprising an autonomous self-propelled vehicle configured to displace the at least one teat cup, and which comprises a milking robot configured to connect the at least one teat cup to a teat of a dairy animal.

12. Milking device according to claim 11, wherein the milking device is displaceable as a whole by the autonomous self-propelled vehicle.

13. A milking device, comprising
at least one teat cup, wherein the teat cup comprises a cup casing with a flexible cup liner around a teat space, a single pulsation space and a milk line,
a milking vacuum pump connected to the milk line, the milking vacuum pump providing a milking vacuum,
a pulsator connected to the pulsation space, the pulsator providing a controllable air pressure in the pulsation space, and
a control device configured to control at least the pulsator during at least a milking action, and
wherein the control device is further configured such that during substantially an entire period of time between two milking actions, the control device controls at least one of the pulsator and the milking vacuum pump to provide a substantially non-pulsating pressure difference between the pulsation space and the teat space such that the cup liner shuts off the teat space from the milk line.

* * * * *